United States Patent [19]

Smith et al.

[11] 4,091,390

[45] May 23, 1978

[54] ARRANGEMENT FOR MULTI-ORIFICE INK JET PRINT HEAD

[75] Inventors: Normand Coy Smith; Joseph Townsend Wilson, III, both of Endicott, N.Y.

[73] Assignee: International Business Machines Corporation, Armonk, N.Y.

[21] Appl. No.: 752,773

[22] Filed: Dec. 20, 1976

[51] Int. Cl.$^2$ .................. G01D 15/18

[52] U.S. Cl. .................. 346/75

[58] Field of Search .................. 346/75

[56] References Cited

U.S. PATENT DOCUMENTS

| | | | |
|---|---|---|---|
| 3,739,395 | 6/1973 | King | 346/75 |
| 3,813,676 | 5/1974 | Wolfe | 346/75 |
| 3,882,988 | 5/1975 | Sloan et al. | 197/1 R X |
| 3,938,163 | 2/1976 | Fujimoto et al. | 346/75 |
| 4,010,477 | 3/1977 | Frey | 346/75 |
| 4,014,029 | 3/1977 | Lane et al. | 346/75 X |
| 4,025,925 | 5/1977 | Jensen et al. | 346/75 |

*Primary Examiner*—George H. Miller, Jr.
*Attorney, Agent, or Firm*—Kenneth P. Johnson

[57] ABSTRACT

Recording arrangement in which a row of ink jet nozzles is inclined with respect to the relative motion of a recording surface to permit the variously and selectively charged drops from each nozzle to be deflected by a single pair of planar electrostatic deflection plates common to all nozzles and parallel to the row so that each nozzle is capable of producing marks at regularly spaced locations along a plurality of parallel rows. Also disclosed is a method of determining the angle of inclination. The inclination angle, nozzle spacing, and deflection levels are preferably chosen so that marks can be placed at all possible data points by a single row of nozzles in a single recording pass. The disclosed method also provides for recording in either direction, the use of two or more parallel nozzle rows, and for the interlacing of drop marks at the recording surface.

7 Claims, 6 Drawing Figures

ARRANGEMENT FOR MULTI-ORIFICE INK JET PRINT HEAD

BACKGROUND OF THE INVENTION

High speed ink jet printing employs multiple nozzles, each producing a stream of drops that are selectively deflected to designated data points on a recording surface. Usually, the plurality of nozzles is arranged in a row transverse to the relatively moving recording surface and each nozzle has its own drop charging ring and its own set of deflection plates to appropriately direct the drop to their respective data points. Unwanted drops are directed to a catcher or gutter for accumulation and possible reuse.

The arrangement shown in U.S. Pat. No. 3,786,517 to K. A. Krause, shows a typical transverse orientation of a nozzle plurality. The number of nozzles and their controls is optional and can be the number required to record a full line on the record surface. Many deflection levels are necessary to record with the resolution desired. These numerous deflection levels add greatly to the control signal complexity because of compensation to counteract adverse effects of charge interaction and aerodynamics.

A somewhat similar arrangement is shown in U.S. Pat. No. 3,739,395 to K. O. King in which a plurality of transverse rows are used, each offset slightly from the preceding in order to cover all data points along the width of the recording surface. The streams can be deflected in two orthogonal directions; each nozzle in a row has an individual pair of deflection electrodes and all of the nozzles in a row have a pair of common deflection electrodes at right angles with respect to the individual pairs. Deflection by the common electrode is in the direction of motion.

In both of the foregoing patents there is difficulty in making the necessary structure sufficiently small to cover all desired data points on a recording surface. In addition, the control of the drop charging and deflection signals becomes exceedingly complex.

Another transverse arrangement of nozzles is shown in U.S. Pat. No. 3,871,004 and uses selectively operable deflection electrodes to move ink drops a single level of deflection above or below the nozzle with respect to motion of the nozzle row. The drops are generated only on demand and are not selectively charged, but are deflected by the presence of a switched attracting field. Each electrode is discretely contoured adjacent each nozzle.

A different approach has been to increase the number of nozzles in the transverse row and provide one nozzle per line of data points so that the control is binary with the drops being either allowed to reach the recording surface or deflected to a gutter. This arrangement is illustrated in U.S. Pat. No. 3,373,437 to R. G. Sweet et al. Such an arrangement has not been acceptable, however, because the nozzles cannot be placed sufficiently close together to meet the resolution requirements. Quality printing requires approximately 240 pels or print elements per inch or more.

Another proposed solution is that described in a U.S. patent Application entitled "Multi-Nozzle Ink Jet Print Head Apparatus," Ser. No. 671,920, filed Mar. 29, 1976, by K. A. Krause and assigned to the assignee of the present application. In that application, multiple rows of nozzles are inclined with respect to the relative document-to-print head motion so that drops from a series of nozzles are able to impact the recording surface in an overlapping or contacting manner to produce a line segement. The inclination of the nozzle rows is relatively steep because the nozzles, due to structural limitations, cannot be placed sufficiently close to one another. In order to produce a linear mark extending across the width of the recording surface, numerous nozzle series must be accurately positioned and controlled. One nozzle is needed for each row of print elements or data points in the printed line.

Another proposed solution has been disclosed in a U.S. patent application entitled "Multi-Nozzle Ink Jet Printer And Method of Printing," Ser. No. 646,130, filed Jan. 2, 1976 by D. F. Jensen, et al., and assigned to the assignee of the present application. In that application, a series of ink jet nozzles are arranged in a row inclined to the relative motion between the print head and recording surface. The drops in the stream from each nozzle are selectively controlled to impact the recording surface at different levels of deflection. Each nozzle is capable of printing a plurality of lines of data points, and each nozzle has its own deflection means. When recording occurs during continuous relative motion, each deflection means must be individually tailored to lead the approaching desired data point to accurately place the ultimate mark.

The known ink jet printers require either individual deflection devices for each ink stream, are limited to a single level of deflection, or can deflect only along the direction of relative motion. In addition, these printers either do not have to consider a compensation for relative motion between the ink streams and recording surface, or they have adjustments in the structure or signals individual to each stream.

It is accordingly a primary object of this invention to provide an arrangement of common planar electrodes capable of deflecting the ink streams of a plurality of nozzles each to a plurality of levels of deflection during continuous relative motion with respect to the recording surface.

Another object of this invention is to provide an arrangement of a plurality of ink jet nozzles and charging means with a pair of common electrodes capable of deflecting the drops in each nozzle stream to a plurality of levels of deflection which includes compensation via electrode orientation for relative motion between the nozzles and the recording surface.

Yet another object of this invention is to provide a method of determining the inclination of a row of nozzles and deflection electrodes with respect to a recording surface which includes compensation by a common electrode adjustment for relative motion of the nozzles and surface and permits selection of different matrical arrangements of drop placement on the surface.

A still further object of this invention is to provide an electrostatically deflected ink jet recording arrangement for a plurality of nozzles aligned in one or more parallel rows inclined with respect to the relative motion of the recording surface, each nozzle of which can record a plurality of parallel rows of drops at predetermined data points on an orthogonal grid on the recording surface.

SUMMARY OF THE INVENTION

The foregoing objects are attained in accordance with the invention by arranging a plurality of nozzles in a row with each nozzle having a drop charging means and all nozzles being located so as to direct their streams in parallel between a single pair of planar, parallel electrostatic deflection plates toward a recording surface. As the drops issue concurrently from all nozzles, the drops or group of drops selected for recording are charged according to the desired level of deflection and, due to the electrostatic field of the electrodes, are deflected along trajectories normal to the longitudinal axis of the electrodes to a respective data point on the recording surface. Uncharged drops are not deflected and are caught in a gutter for reuse.

The row or rows of nozzles and parallel electrode pair are inclined with respect to the direction of relative motion. Each nozzle is then able to print a row of marks during recording surface movement for each level of deflection. Since the deflection of any charged drops is normal to the electrodes and those drops require finite flight time to reach respective data points on the recording surface, the angle of inclination according to the invention requires a consideration of several factors. Among these are the data point pattern and spacing desired, the number of levels of deflection to be recorded by each nozzle, the orthogonal nozzle spacing, and the number of drops generated by a nozzle as movement occurs between recordable data points in a row in the direction of travel. These relationships are integer values or integer multiples of the data point spacing in the same coordinate direction.

An inclined nozzle row with means to achieve multiple levels of deflection permits simplification of the recording structure and allows greater nozzle spacing. Nozzle row inclination is readily adaptable to different drop frequencies and recording velocities and can be adjusted to accommodate a variety of orthogonal data point spacings. Printing can be done in either a forward or reverse raster and the drops can be deposited by interlacing, if desired.

The foregoing and other objects, features and advantages of the invention will be apparent from the following more particular description of preferred embodiments of the invention, as illustrated in the accompanying drawings.

DETAILED DESCRIPTION OF THE INVENTION

Figure 1:
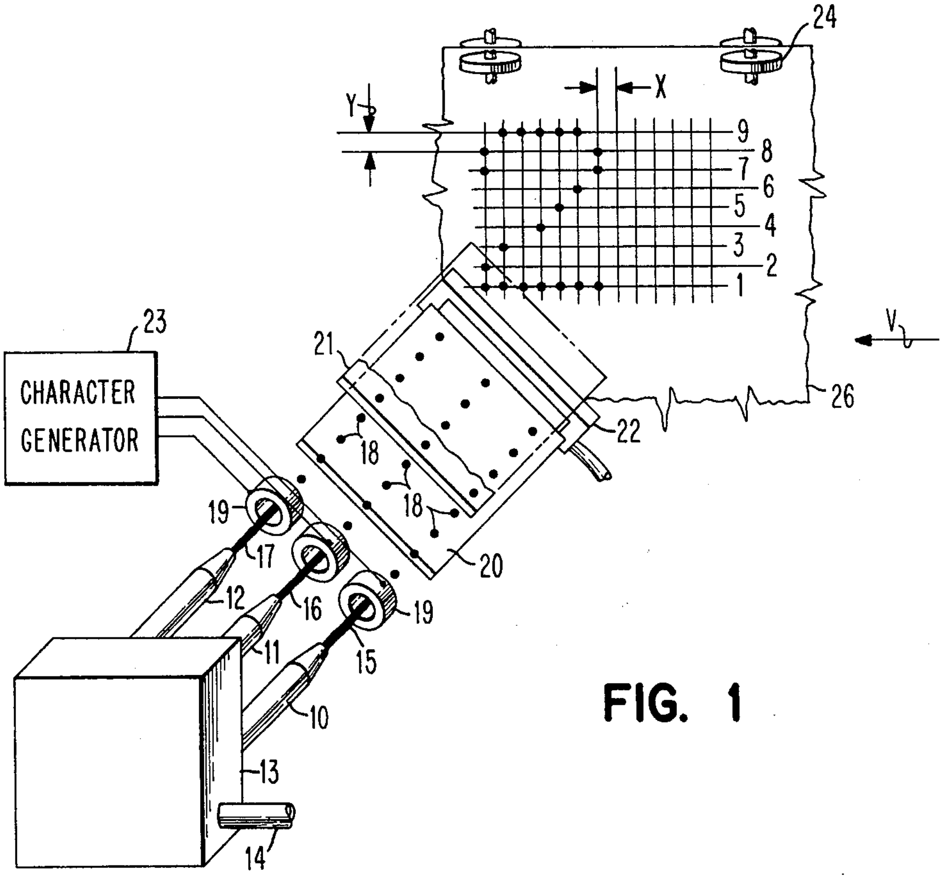
FIG. 1 is a schematic diagram of an ink jet recording apparatus arranged in accordance with the principles of the invention.

Referring to FIG. 1, a plurality of nozzles 10, 11 and 12 receive ink from pressurized manifold 13 which is replenished via supply tube 14. The ink within manifold 13 is subjected to cyclic pressure disturbances by any of several well known means, not shown. Then, as the ink issues in respective streams 15, 16 and 17 from each of the nozzles, the stream cross-sections are not uniform and the streams break up at a common, and preferably constant, frequency into individual drops 18 within a stream charge ring 19 to which electrical signals are selectively applied by a character generator 23. As each drop breaks off from the stream, it carries a charge proportional to the signal on the charge ring at the time of break-off and travels between a pair of electrostatic deflection electrodes or plates 20 and 21 which have a constant high voltage thereacross. One of the deflection plates, in this instance plate 20, has a gutter 22 for catching unwanted drops. For example, in this embodiment, drops which are to be discarded into the gutter are not given any charge; hence, the drops will not be deflected by the electrostatic field between plates 20 and 21 and will pass directly into gutter 22. Each charged drop, however, will continue toward the recording paper sheet 26, moved by rollers 24, and will impact the sheet at a selected spot, according to the magnitude of its charge, nozzle position, and time of charging. Drops may, of course, receive other charges for opposite deflection.

In this illustration, the drops in each of the three streams are selectively charged with one of three different voltages by the respective charge rings so that the drops are deflected to one of three sets of horizontal lines on the recording surface. For example, drop stream 15 from nozzle 10 is used to record the bottom three rows 1–3 of marks of the character "2" while stream 16 from nozzle 11 records the middle three rows 4–6 and stream 17 from nozzle 12 records the top three mark rows 7–9. The charging signals are applied to the charge rings in synchronization with drop frequency and break-off in each stream to produce the required deflection. Fewer or additional levels of deflection can be used, if required.

In this description, the term "data point" is intended to mean a possible mark location and, in the illustration, is each intersection of uniformly spaced orthogonal rows and columns in which the horizontal or "X" dimension between adjacent intersections is equal to the vertical or "Y" dimension between adjacent intersections. This results in a square matrix of data points. However, as described herinafter data points can also be recorded having different X and Y dimensions.

In the figure, the row of nozzles 10–12 are arranged along a line that is inclined with respect to the direction of motion of the recording sheet 26, indicated by the arrow. As charged ink drops enter the electrostatic field between the parallel electrodes 20 and 21, they will be deflected in a direction normal to the longitudinal axis of the electrodes. Therefore, deflection with respect to the nozzle will occur along a line that is also inclined with respect to the direction of relative motion of the recording surface. Drops are selected or charged according to the need for a mark at a particular data point. Such selection is under the control of the character generator.

Figure 2:
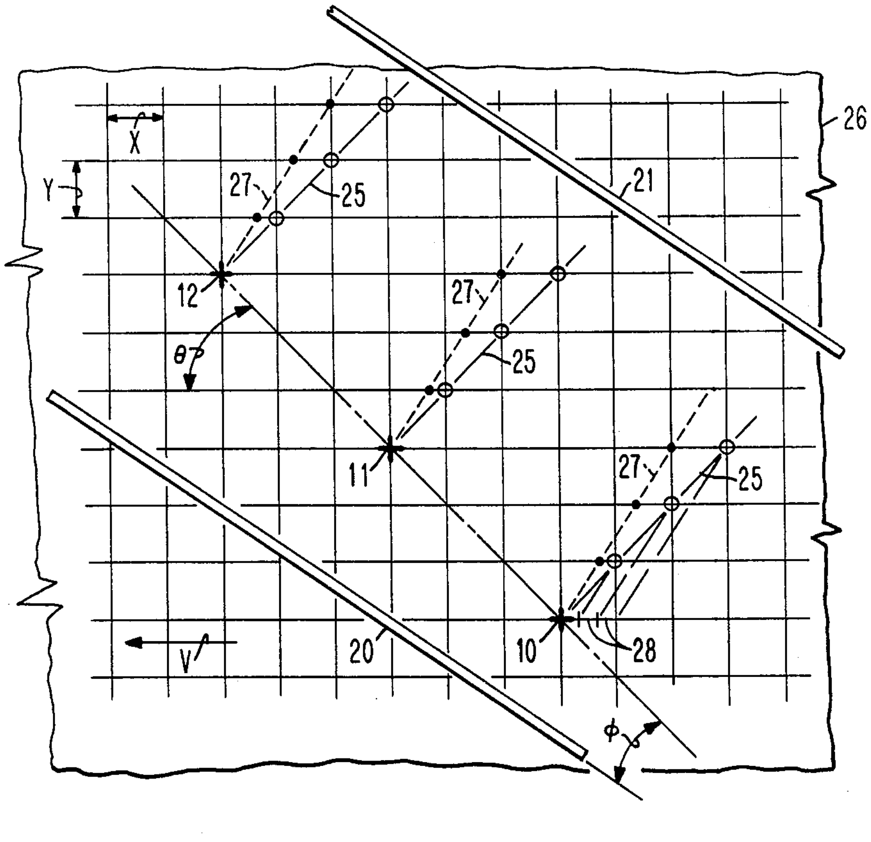
FIG. 2 is a diagram illustrating in greater detail the occurrence of marking a relatively moving sheet with the recording apparatus of FIG. 1.

Referring to FIG. 2, there is shown a portion of sheet 26 having intersecting, orthogonal grid lines thereon which define possible data points for recording marks by impacting ink drops. Each data point, separated by horizontal distance X and vertical distance Y, is intended as a possible site for drop placement and is recordable in this figure in a single pass between the row of nozzles 10, 11, and 12 and recording sheet 26. Data points intended for recording by each nozzle are indicated by solid circles and ink drops for producing respective marks are indicated by solid dots, as viewed from the nozzle. Relative sizes of drops and marks and the grid have been distorted for purposes of explanation. Practically, the X and Y spacings between grid intersections may approximate 0.1 mm. or less. In this example, the proper motion is in the horizontal direction indicated by the arrow.

The recording of each data point on a square grid requires the least deflection when the data points lie at an angle of 45° with respect to the direction of motion of recording surface 26. At this angle, the data points at each successive level of deflection are displaced an X unit, the miminum, along the axis of relative motion between the recording surface and nozzles. During the horizontal movement of sheet 26 from one vertical column of data points to the next, each nozzle must be capable of producing sufficient drops for all assigned data points.

In this figure, nozzles 10, 11 and 12 are indicated by "+" and each must have the capability of producing a series of at least three recordable drops or drop groups during the time required for horizontal motion between columns of data points. Therefore, a mark pattern is shown which represents the three possible marks formed by drops from each nozzle while the paper advances one X unit. In this description "series of drops" and "a series of marks" refers to all drops generated or marks recordable during the recording surface advance of one X unit.

The actual motion between the recording surface and printing means requires compensation, and this is shown in FIG. 2. The drops, as they are generated, must be aimed to lead their corresponding mark sites because of the relative motion during drop flight time and because of the delay due to successive generation of drops or groups of drops from a nozzle. Since the flight time of each drop is approximately the same, the compensating lead of each drop for recording surface motion during droplet flight time is the same. Therefore, translating the nozzles and drops with respect to the recorded marks along the axis of relative motion has the same effect as changing the flight time of all drops. This, however, does not alter the angular relationships between the nozzles, marks and drops. Accordingly, each nozzle 10, 11 and 12, is located on lines 25 through the marks to be formed by drops from the respective nozzles. Each nozzle is illustrated as capable of recording three horizontal rows of data points. Uncharged drops that are not to be deflected are caught in a gutter. Drops are shown fully deflected as they would pass through the plane of the recording medium, but leading the actual point of impact as of the time of generation.

The required compensation for successively generating drops while the recording surface is moving means that the ink drops from a nozzle will have to be actually deflected along lines 27 slightly in advance of the intended respective data points. As the charged drops enter the electrostatic field between electrodes 20 and 21, their direction of deflection will be parallel to the potential gradient and normal to the electrode axes. Therefore, parallel electrodes 20 and 21 must be repositioned at an angle $\phi$ with respect to the nozzle row to provide for the necessary lead of those drops intended for marking. This divergence between the nozzle row and the deflection electrodes results in increasing the electrode spacing to accommodate the nozzle row, necessitating excessive voltages between the electrodes. An alternative to the increased electrode spacing is to provide individual electrodes for each nozzle but these electrodes produce distorted electrostatic fields.

Figure 3:
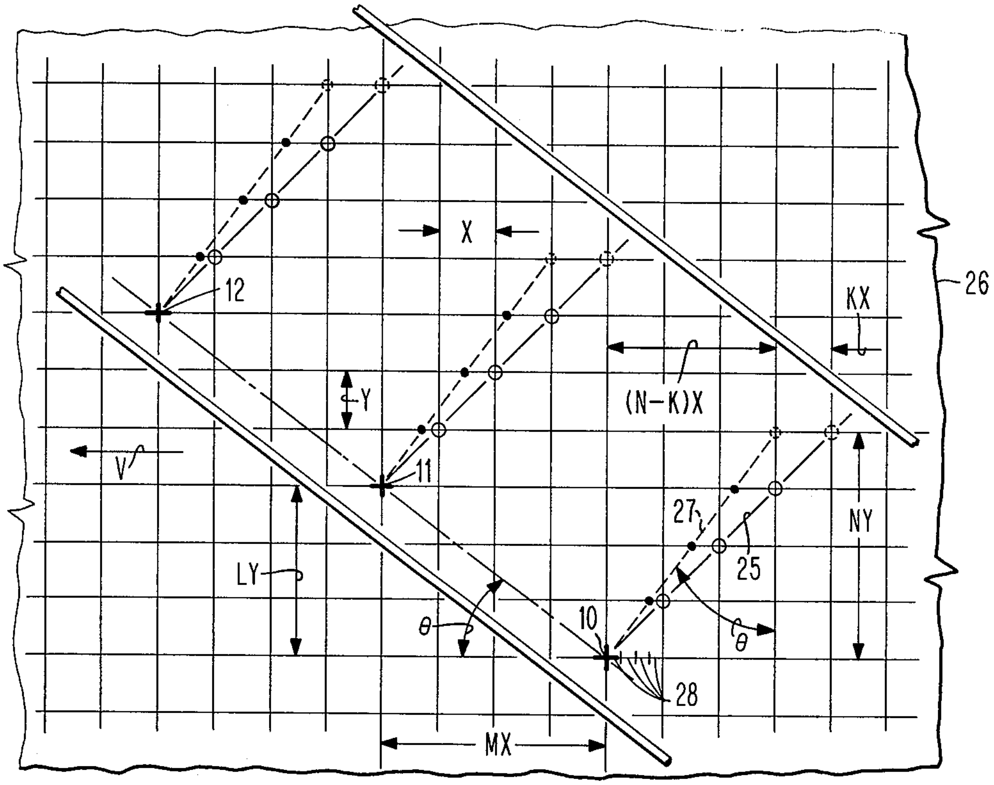
FIG. 3 is similar to FIG. 2 but illustrates the geometric relationships necessary to align the deflection electrodes parallel to the nozzle row.

The provision of a compensating lead angle for generation of successive drops, however, is possible when nozzles 11 and 12 are repositioned at greater distances than their original spacing and the levels of deflection and drop frequency are considered. Certain dimensional relations may then be established to permit the angle $\theta$ to be varied for both a square grid or other arrangement. A nozzle spacing which still permits the deflection electrodes to be parallel to the nozzle row and at an acceptable separation is shown in FIG. 3. The data points lie at the intersections of orthogonal lines as in FIG. 2 and form a square grid. The marks formed by the nozzles during a drop series also lie at an angle of 45° with respect to the direction of relative motion. Nozzles 10, 11, and 12, however, have been shifted along the horizontal.

Since the recording apparatus is to be capable of marking at all data points, adjacent nozzles are to leave no horizontal row of data points non-recordable. This dictates that the number of levels of deflection available, which is an integer value, be equal to or greater than the number of horizontal rows between nozzles. In this case, three or more levels of deflection are required. Extra drops, shown in broken lines, would be discarded and the potential superfluous marks, also shown in broken lines, would not be recorded. The successive positions of the printhead during the generation of a drop series is represented by intervals 28 in FIG. 3 to the right of nozzle 10. In order to maintain the accuracy of drop placement at each data point required of each nozzle, the numbered intervals must be an integer value; otherwise, fractional intervals will occur resulting in erroneous placement. It will be noted that each successive drop or drop group from nozzle 10 occurs at an interval 28 later than its predecessor but still leads its respective data point by a constant value. The illustrated sequence of successively greater deflection values for each drop is commonly referred to as forward rastering, while the deflection of drops in a series to successively decreasing deflection levels is reverse rastering. Reverse rastering is discussed later herein.

The horizontal spacing of adjacent nozzles can vary considerably when the nozzles are in a common row. There is a limitation, however, in that the horizontal spacing, must be such as to maintain the uniformity of the vertical spacings from nozzle to nozzle. Thus, only certain relationships of the vertical and horizontal dimensions are operable to define an acceptable angle of $\theta$, the angle between the nozzle row and path of motion.

The determination of the angle $\theta$ must also involve for consideration the number of drops generated in the series including any discarded drops and the distance traveled by the nozzle row during each generated drop series. For the deflection electrodes to be parallel to the nozzle row, lines 27 through the drops must be perpendicular to the nozzle row. The value of $\theta$ for the angle of inclination is then determined from these relationships by the following simultaneous equations:

$$\text{Tan } \theta = LY/MX \qquad (1)$$

and $$\text{Tan } \theta = (N-K)X/NY \qquad (2)$$

where X and Y are the respective horizontal and vertical separations between adjacent data points, M and L are the respective number of data points between adjacent nozzles along the path of relative motion and an axis normal thereto, N is the number of data points possible to mark with each drop series generated, and K is the number of data points of relative movement along the path of motion during the generation of the series of drops necessary to mark N data points. Each of the values L, M, N and K must be integers. The values of N and K determine the relationship between the drop rate and the relative velocity of the nozzle row with respect to recording surface. Equations 1 and 2 can be combined to yield the following reltionship as seen in FIG. 3:

$$LY/MX = (N-K)X/NY \qquad (3)$$

Frequently data points will be at the intersections of equally spaced orthogonal axes. This results in the "X" and "Y" terms dropping out of the foregoing equations. When other grid proportions are desired, the "X" and "Y" terms express the ratio of the two respective dimensions.

Likewise in most applications, K will probably be equal to 1, since coverage of all data points will be accomplished in a single pass between nozzle row and recording surface. A single pass eliminates the potential misplacement of drops due to misalignment of two or more nozzle rows, dual passes, or errors in signal or drop generation frequency. However, in those instances when the recording velocity is too fast for a single nozzle row and the available drop rate, then K may be a larger integer value.

Considering equation (3) there are three groups of solutions: X = Y, L = N, and X = Y when L = N. The last is a special situation and perhaps the most efficient in terms of marks versus drops generated.

The number of drops N in a series can be equal to the number of levels used for deflection or the number of drops can be larger. For example, in FIG. 3, N = 4 and three levels of deflection are used. Thus, the fourth or extra drop is discarded, that is, not charged and directed to the gutter. It should be noted that successive drops can be similiarly charged as groups and used to form a single mark. For instance, two or three drops or more may be used for each mark, or two or more drops may be generated for each drop used to form a mark and the extra drops in each group discarded. However, the number of drop groups generated during KX motion must be equal to an integer value in order to maintain placement accuracy.

Figure 4:
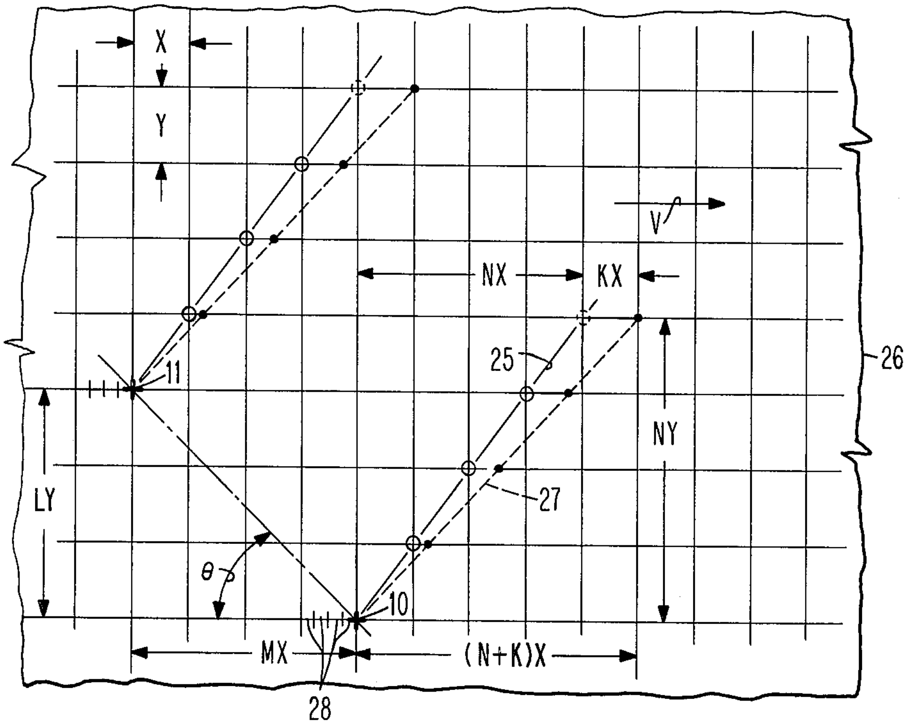
FIG. 4 is a diagram similar to FIG. 2 but with the direction of relative motion reversed.

The direction of relative motion between nozzles 10, 11, 12 and recording sheet 26 can be reversed while maintaining forward rastering. The effect of this change is illustrated in FIG. 4. Data points to be recorded again lie along a line through the intersections of diagonal data points. The nozzles are again positioned with respect to the marks so that line 27 through the drops intersects line 25 through the marks at the respective nozzles. The deflected drops must lead the ultimate respective marks to compensate for the relative motion. The effect of the direction change is to require that the value K be added to the value N in equation (3) rather than subtracted so that the equation will appear thus:

$$LY/MX = (N+K)X/NY \qquad (4)$$

Again the constraint is the values L, M, N and K be integers. However, because of the condition that N be equal to or greater than L, there is no obvious solution to equation (4) with integer values of L, M, N and K where X = Y. Therefore, for this orientation the data points and the two orthogonal directions must be in the ratio:

$$X/Y = [M(N+K)/LN]^{\frac{1}{2}} \qquad (5)$$

This is evident in FIG. 4 where X and Y distances are unequal.

Figure 5:
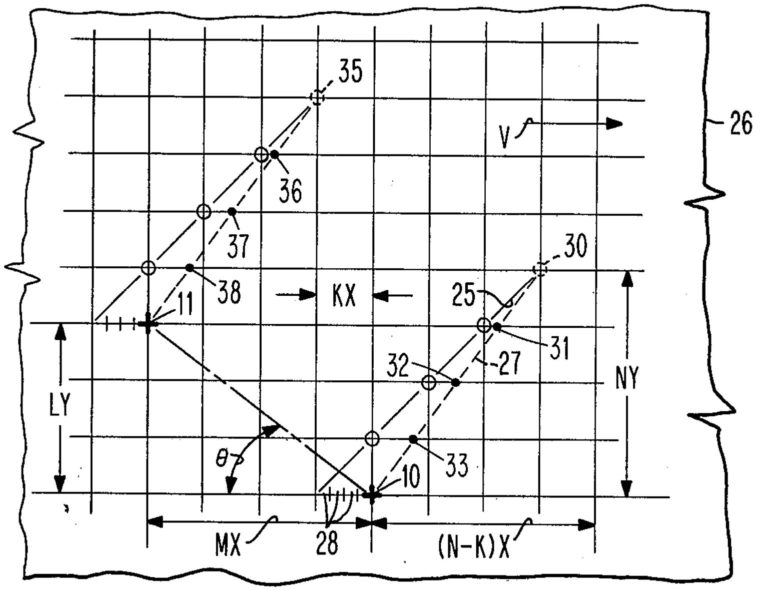
FIG. 5 is a diagram similar to FIG. 2 but illustrating the effect of reverse rastering.

The direction of relative motion can be reversed with the angles of nozzle row inclination merely by using reverse rastering of the drops. This is illustrated in FIG. 5 where nozzles 10 and 11 are inclined along the same angle as in FIG. 3, but the movement of sheet 26 is in the opposite direction. The first drop of a series N, theoretically destined for the cross-hatched mark 30 for nozzle 10 or mark 35 for nozzle 11 is actually discarded, then drops 31, 32, and 33 and drops 36, 37, and 38 are generated with each successive drop in a series carrying less charge and impacting sheet 26 at the coincident and corresponding marks. The drops of a series are each generated after successive intervals 28 and are deflected along lines 27 normal to the nozzle row. The use of forward and reverse rastering allows marks to be recorded in either direction without changing the inclination of the printhead and deflection apparatus.

In FIG. 5, the nozzles and drops have been translated with respect to the marks so that the line 27 through the drops intersects line 25 through the marks at the theoretical location of the first marks 30 and 35. This has been done to illustrate the geometric relationship. When the direction of both the raster and printhead travel has changed, the timing of a drop series will require some minor adjustment but the remaining angular relationships still hold.

A refinement in the deflection of drops to multiple levels is that of interlacing. This refinement improves drop placement accuracy by further separating drops in flight to avoid charge and aerodynamic interaction in which the charges and aerodynamic turbulence of neighboring drops are sufficient to modify the trajectories of drops from that which is desired. Interlacing is accomplished by avoiding the placement of successively charged drops at adjacent mark positions.

Figure 6:
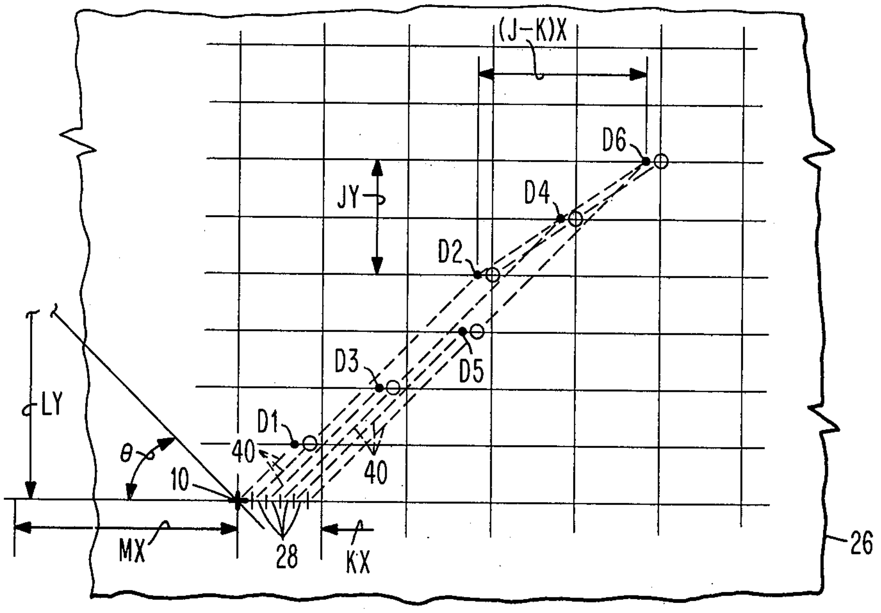
FIG. 6 is a diagram illustrating drop interlacing with the recording arrangement of FIG. 1.

An inclined orifice row with multi-level drop deflection is adaptable to drop interlacing as seen in FIG. 6. Interlacing is of doubtful benefit with fewer than 5 deflection levels and is illustrated in the figure as comprising a series of six drops. Only nozzles 10 and 11 are shown which lie along an inclined row at an angle $\theta$ with respect to the travel of sheet 26. The X and Y dimensions will be noted as unequal. This has been done merely for convenience of illustration. With the deflection plates parallel to the nozzle row, drops are deflected normal to the row along respective lines 40, and are generated at intervals 28 during the movement of the sheet through distance KX. The drops designated 1–6 in order of generation form two sub-series of marks. For example, drops 1, 3, and 5 form a first sub-series and drops 2, 4, and 6 form a second sub-series. From the designated mark locations, it will be seen that the marks resulting from one sub-series is offset with respect to those of the second sub-series by a fraction of the distance KX moved during generation of the entire series of six drops. The amount of offset for interlacing may be expressed as:

$$\text{Offset} = (KX/N)[N/J - 1] \quad (6)$$

where KX is the distance moved during the generation of a drop series, N is the number of drops generated in the series, and J is the number of drops in each sub-series. It will be noted that interlacing can be extended to more than two sub-series and that each will be offset with respect to the others.

The determination of the angle of inclination when using interlacing is similar to equations (1) and (2) except that it may be determined using the data points of a sub-series along a line parallel to the direction of motion. The combined result would be:

$$JY/MX = (J-K)X/LY \quad (7)$$

Since the direction of the printhead velocity with respect to the recording medium and the sequence of mark generation (away from the nozzle) are the same as in FIG. 3, it is appropriate to compare equation (7) with equation (3). It is seen that the two equations are identical when N = J.

During printing with an inclined row of nozzles and multiple levels of deflection, the selection of recordable points is somewhat complex. Each nozzle can place a drop or drops in a different vertical row for each level of deflection during the generation of a single series of drops. For example, the nozzles will move three columns while printing a vertical line segment with one nozzle as shown in FIG. 1. Each nozzle will generate a single mark at a different deflection level for each column moved. Drops for all other levels will be discarded. Thus, the charging control for the drops requires consideration of the necessary omissions.

As mentioned above, the amount of movement of a nozzle row during generation of the series of drops for printing at all levels of deflection can be equal to the spacing of adjacent grid columns or some multiple thereof. For example, if the value K were 2, the printhead could incorporate two parallel nozzle rows separated by some integer value of the column-to-column distance and each nozzle would then produce its series of N drops during the movement of the head over the new K value. An alternative would be to make two or more sweeps of the single nozzle row over the same recorded line but displaced in time of drop placement to record in areas left blank during the first pass.

In all examples, the printing means has been depicted as fixed in position with respect to the recording medium. All the relationships discussed above hold if the recording medium is fixed and the printing means moves when the relative velocity is the same.

While the invention has been particularly shown and described with reference to preferred embodiments thereof, it will be understood by those skilled in the art that the foregoing and other changes in form and details may be made therein without departing from the spirit and scope of the invention.

What is claimed is:

1. Recording apparatus comprising:

a plurality of nozzle means arranged in a row and issuing parallel streams of drops toward a recording member;

means including a pair of electrodes parallel to said row for establishing a transverse electrostatic field between said nozzle row and said recording member;

individual means for each nozzle means for selectively inducing any of different predetermined electrical charges in each of the drops issuing therefrom whereby the charged drops from each nozzle are deflected by said field to any of a plurality of levels for deposition in any of a plurality of mark sites on said member according to the charges carried thereby; and means for producing relative motion between said nozzle row and said member along a path inclined with respect to the longitudinal axis of said row at an angle $\theta$ defined by the two simultaneous equations:

$$\text{Tan } \theta = LY/MX \text{ and Tan } \theta = (N \pm K)X/NY$$

wherein X and Y are respectively the separation distances between adjacent possible mark sites along said path and an axis orthogonal thereto; L and M are respectively the numbers of possible mark sites between adjacent nozzles along said path and said orthogonal axis; K is the number of possible mark sites passed during the generation of a series of drops from a said nozzle necessary to deposit drops at all possible levels of deflection for a said nozzle; and N is the number of mark sites possible to mark with said drop series, said L, M, K and N being integers and the sign of K being dependent on the direction of motion along said path.

2. Apparatus as described in claim 1 further including gutter means for intercepting drops not to be deposited on said member.

3. Apparatus as described in claim 1 wherein successively charged drops in a said series each bear a greater charge than the preceding charged drop.

4. Apparatus as described in claim 1 wherein successively charged drops in a said series each bear a lesser charge than the preceding charged drop.

5. Apparatus as described in claim 1 wherein the drops deposited at each mark site are groups of similarly charged drops.

6. Apparatus as described in claim 1 wherein the drops deposited on said member lie at mark sites arranged in orthogonal rows and columns.

7. In an ink jet printer having a row of nozzles from which parallel streams of drops issue, selective drop charging means, a pair of electrostatic deflection plates parallel with said row for deflecting drops from each nozzle to form marks at a plurality of matrical intersections on a relatively moving record medium according to the drop charge values, the improvement of orienting said nozzle row diagonally with respect to the path of relative motion such that an acute angle $\theta$ between said nozzle row and motion path is defined by the two simultaneous equations:

$$\text{Tan } \theta = LY/MX \text{ and Tan } \theta = [(N \pm K)/N](X/Y)$$

wherein X is the separation distance between adjacent intersections along said path, Y is the separation distance between adjacent intersections along an axis orthogonal to said path, M is the number of intersections between adjacent nozzles along said path, L is the number of intersections between adjacent nozzles along said orthogonal axis, K is the number of intersections along said path occurring during the generation of a series of drops from a said nozzle necessary to print marks at all possible levels of deflection for said nozzle, and N is the number of intersections possible to mark with each said series of drops, said L, M, K and N being integers and the sign K being dependent upon the direction of said relative motion along said path.

* * * * *